United States Patent
Heiser et al.

(10) Patent No.: US 10,911,572 B2
(45) Date of Patent: Feb. 2, 2021

(54) SYSTEMS AND METHODS FOR DYNAMIC APPLICATION MANAGEMENT WITH AN AUTONOMOUS VEHICLE

(71) Applicant: Renovo Motors, Inc., Campbell, CA (US)

(72) Inventors: Christopher Heiser, Campbell, CA (US); Khalid Azam, Campbell, CA (US); Jason Stinson, Campbell, CA (US); Ioannis Petousis, Campbell, CA (US); Anand Ramesh, Campbell, CA (US)

(73) Assignee: Renovo Motors, Inc., Campbell, CA (US)

( * ) Notice: Subject to any disclaimer, the term of this patent is extended or adjusted under 35 U.S.C. 154(b) by 0 days.

(21) Appl. No.: 16/589,544

(22) Filed: Oct. 1, 2019

(65) Prior Publication Data

US 2020/0106861 A1    Apr. 2, 2020

Related U.S. Application Data

(60) Provisional application No. 62/739,623, filed on Oct. 1, 2018.

(51) Int. Cl.
*H04L 29/08* (2006.01)
*B60W 50/04* (2006.01)

(52) U.S. Cl.
CPC ............ *H04L 67/34* (2013.01); *B60W 50/04* (2013.01); *H04L 67/327* (2013.01)

(58) Field of Classification Search
CPC ...... H04L 67/34; H04L 67/327; B60W 50/04; B60W 2050/0006; B60W 2050/009; B60W 60/001
See application file for complete search history.

(56) References Cited

U.S. PATENT DOCUMENTS

| | | | |
|---|---|---|---|
| 2010/0228650 A1* | 9/2010 | Shacham | G06F 16/2455 705/34 |
| 2013/0246511 A1* | 9/2013 | Brown | G06F 9/485 709/203 |

(Continued)

OTHER PUBLICATIONS

Kumar, et al., "Integrating On-board Diagnostics Speed Data with Sparse GPS Measurements for Vehicle Trajectory Estimation", SICE Annual Conference 2013, Sep. 14-17, 2013, Nagoya University, Nagoya, Japan, p. 2302-2308. (Year: 2013).*

*Primary Examiner* — Gil H. Lee
*Assistant Examiner* — Chhian (Amy) Ling
(74) *Attorney, Agent, or Firm* — Jeffrey Schox; Shant Tchakerian (57) ABSTRACT

A system and method for dynamically managing application loads on a vehicle includes: receiving a plurality of distinct application requests; for each one application request, identifying expected computing resource expenditure data based on one or more attributes of each one application request; and identifying current state data for each of a plurality of computing resources of the vehicle based on an expected utilization of each of the plurality of computing resources for fulfilling each one application request; dynamically generating an execution schedule for executing a subset of or each of the plurality of distinct application requests based on (1) the expected computing resource expenditure data for each one application request and (2) the current state data for each of the plurality of computing resources of the vehicle; and executing the subset of or each of the plurality of distinct application requests based on the execution schedule.

16 Claims, 3 Drawing Sheets

200

Receiving App Run Requests S210

Filtering Requested Data Resources S215

Identifying Resource State Data S220

Identifying Computing Cost Data S230

Generating Execution Schedule S240

Configuring Computing Resources S250

(56) References Cited

U.S. PATENT DOCUMENTS

2017/0295253 A1\* 10/2017 Siegel ................ H04L 41/5029
2019/0034246 A1\* 1/2019 Miller ................ G06F 9/45558

\* cited by examiner

Receiving App Run Requests S210

Filtering Requested Data Resources S215

Identifying Resource State Data S220

Identifying Computing Cost Data S230

Generating Execution Schedule S240

Configuring Computing Resources S250

SYSTEMS AND METHODS FOR DYNAMIC APPLICATION MANAGEMENT WITH AN AUTONOMOUS VEHICLE

CROSS-REFERENCE TO RELATED APPLICATIONS

This application claims the benefit of U.S. Provisional Application No. 62/739,623, filed 1 Oct. 2018, which is incorporated in its entirety by this reference.

TECHNICAL FIELD

These inventions relate generally to the autonomous vehicle field, and more specifically to new and useful systems and methods for processing data and managing applications in the autonomous vehicle field.

BACKGROUND

As modern vehicles continue to evolve, most apparently, to include vehicles having autonomous and/or semi-autonomous capabilities, the computing functions performed by these modern vehicles correspondingly evolve to include processing enormous loads of sensor data and also, executing a great number and variety of software applications and programs. However, as the computing capabilities and responsibilities of a modern vehicle have improved, the modern vehicle often still operates as a limited or somewhat constrained device in the sense that the computing resources (e.g., CPU, GPU, RAM, bandwidth, etc.) and capabilities of the modern vehicle are finite and limited, especially, relative to the capabilities of many computing platforms with access to additional memory, computer processing elements, energy supplies, etc.

In view of the above context, a problem that arises relates to the over processing of demands and requests made by applications and programs operating on or remotely using the modern vehicle and an associated commandeering of the limited computing resources and capabilities often necessary by the autonomous vehicle for performing important and often critical operations, such as steering, object detection, generally driving, and the like. These applications and programs, therefore, compete for the limited computing resources of the modern vehicle sometimes causing degradation of the operation of the vehicle.

Thus, there is a need in the autonomous vehicle field to create new and useful systems and methods that seek to alleviate the exhaustion of the computing resources of the modern vehicle by taking into account the constrained nature of the autonomous vehicle and the increasing needs of the applications and programs being operated by the modern vehicle and technically providing optimized technical solutions for processing the demands and request by the applications and programs operating with the modern vehicle. The embodiments of the present application provide such new and useful systems and methods.

BRIEF SUMMARY OF THE INVENTION(S)

In one embodiment, a system for dynamically managing application loads on one or more computing systems of a vehicle includes: an onboard computing system of a vehicle that: receives a plurality of distinct application requests from a plurality of distinct applications; for each one application request of the plurality of distinct application requests, identifies expected computing resource expenditure data based on one or more attributes of each one application request; and identifies current state data for each of a plurality of computing resources of the vehicle based on an expected utilization of each of the plurality of computing resources for fulfilling each one application request; dynamically generates an execution schedule for executing a subset of or each of the plurality of distinct application requests based on (1) the expected computing resource expenditure data for each one application request and (2) the current state data for each of the plurality of computing resources of the vehicle; and executes the subset of or each of the plurality of distinct application requests based on the execution schedule.

In one embodiment, if one or more of the plurality of distinct application requests includes one or more requested timetables for execution, the onboard computing system further: predicts future state data for each of the plurality of computing resources of the vehicle based on one or more requested start times in the one or more timetables; predicts future computing resource expenditure data based on one or more attributes of each one application request and an anticipated state of operation of the vehicle; and dynamically generating the execution schedule for executing the subset of or each of the plurality of distinct application requests is further based on (3) the predicted future state data for each of the plurality of computing resources of the vehicle and (4) the predicted future computing resource expenditure data.

In one embodiment, the onboard computing system further: assesses each of the plurality of distinct application requests; and identifies a request type elected from a plurality of distinct request types for each of the plurality of distinct application requests based on the assessment, wherein the identifying the expected computing resource expenditure data for fulfilling each of the plurality of distinct application requests is based on the request type for each of the plurality of distinct application requests.

In one embodiment, the onboard computing system further: assesses each of the plurality of distinct application requests; and identifies one or more requested computing resources for fulfilling each of the plurality of application requests based on the assessment, wherein the identifying the expected computing resource expenditure data for fulfilling each of the plurality of distinct application requests is based on the one or more requested computing resources of each of the plurality of distinct application requests.

In one embodiment, the onboard computing system further: centrally pre-processes data resources that are requested by multiple application requests of the plurality of distinct application requests, wherein the centrally pre-processing includes: identifying overlapping requests from the plurality of distinct application requests for a same type or a same kind of data resource of the vehicle by two or more of the multiple application requests; and identifying the data resource as a multiply-requested data item.

In one embodiment, the onboard computing system further: transmits the multiply-requested data item to a short-term memory until all application requests being executed have completed a use of the multiply-requested data item.

In one embodiment, identifying the current state data for each of the plurality of computing resources of the vehicle includes: identifying a utilization value for each of the plurality of computing resource of the vehicle, wherein the utilization value relates to an amount of a total capacity of a given computing resource that is in use.

In one embodiment, the expected computing resource expenditure data relates to an expected expenditure of a computing resource of the vehicle based on a likely fulfillment of a subject application request.

In one embodiment, identifying the expected computing resource expenditure data includes: for each unique computing resource of the vehicle, identifying an expected utilization value based on the plurality of application requests; and computing the expected computing resource expenditure data for a subject application request based on the expected utilization value.

In one embodiment, identifying the expected computing resource expenditure data includes: identifying computing resource expenditures associated with executing a given application request based on historical execution costs associated with executing a same or a substantially similar application request.

In one embodiment, identifying the expected computing resource expenditure data includes: referencing a predetermined cost schedule based on one or more attributes of the plurality of application request, wherein the predetermined cost schedule includes a listing of estimated costs for executing a plurality of distinct types of application requests.

In one embodiment, one or more cost values of the predetermined cost schedule are updated to include new costs values for executing a given application request when a discrepancy between a predetermined cost value and an actual cost value for executing the given application request is identified.

In one embodiment, dynamically generating the execution schedule includes: generating execution parameters that define for each application request (i) whether the application request is expected to be executed and (ii) an expected execution time for executing the application request.

In one embodiment, dynamically generating the execution schedule includes: generating an execution score for each application request; assessing the execution score against an execution threshold; and identifying a positive execution likelihood or a negative execution likelihood based on the assessment.

In one embodiment, the onboard computing system further: distributes a copy of the execution schedule to each application making an application request of the plurality of distinct application requests; responsive to the distribution, receives one or more modified application requests.

In one embodiment, one or more of the plurality of distinct application requests relates to a request by an onboard third-party application.

In one embodiment, one or more of the plurality of distinct application requests relates to a request by a remote third-party application.

In one embodiment, a method for dynamically managing application loads on one or more computing systems of a vehicle includes: receiving a plurality of distinct application requests from a plurality of distinct applications; for each one application request of the plurality of distinct application requests, identifying expected computing resource expenditure data based on one or more attributes of each one application request; and identifying current state data for each of a plurality of computing resources of the vehicle based on an expected utilization of each of the plurality of computing resources for fulfilling each one application request; dynamically generating by an onboard computing system of a vehicle an execution schedule for executing a subset of or each of the plurality of distinct application requests based on (1) the expected computing resource expenditure data for each one application request and (2) the current state data for each of the plurality of computing resources of the vehicle; and executing the subset of or each of the plurality of distinct application requests based on the execution schedule.

In one embodiment, centrally pre-processing data resources that are requested by multiple application requests of the plurality of distinct application requests, wherein the centrally pre-processing includes: identifying overlapping requests from the plurality of distinct application requests for a same type or a same kind of data resource of the vehicle by two or more of the multiple application requests; and identifying the data resource as a multiply-requested data item.

In one embodiment, the method includes transmitting the multiply-requested data item to a short-term memory until all application requests being executed have completed a use of the multiply-requested data item.

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

Overview

The embodiments of the present application provide systems and methods that function to alleviate the perpetual strain to the computing resources and capabilities of an autonomous vehicle often caused by a combination of the normal operational requirements (e.g., driving, etc.) of the vehicle as well as by the extra operational processing of thousands to millions of routines of applications and programs in communication with or being operated by the autonomous vehicle.

Since one of the primary objectives of an autonomous vehicle is to drive, usually, at relatively high speeds and very safely, one or more of the embodiments of the present application described herein function to dynamically optimize a run schedule for the plurality of applications and the available computing resources of the autonomous vehicle based on the driving circumstances of the autonomous vehicle and the run requests provided by each of the plurality of applications.

1. System for Dynamic Application Execution

Figure 1:
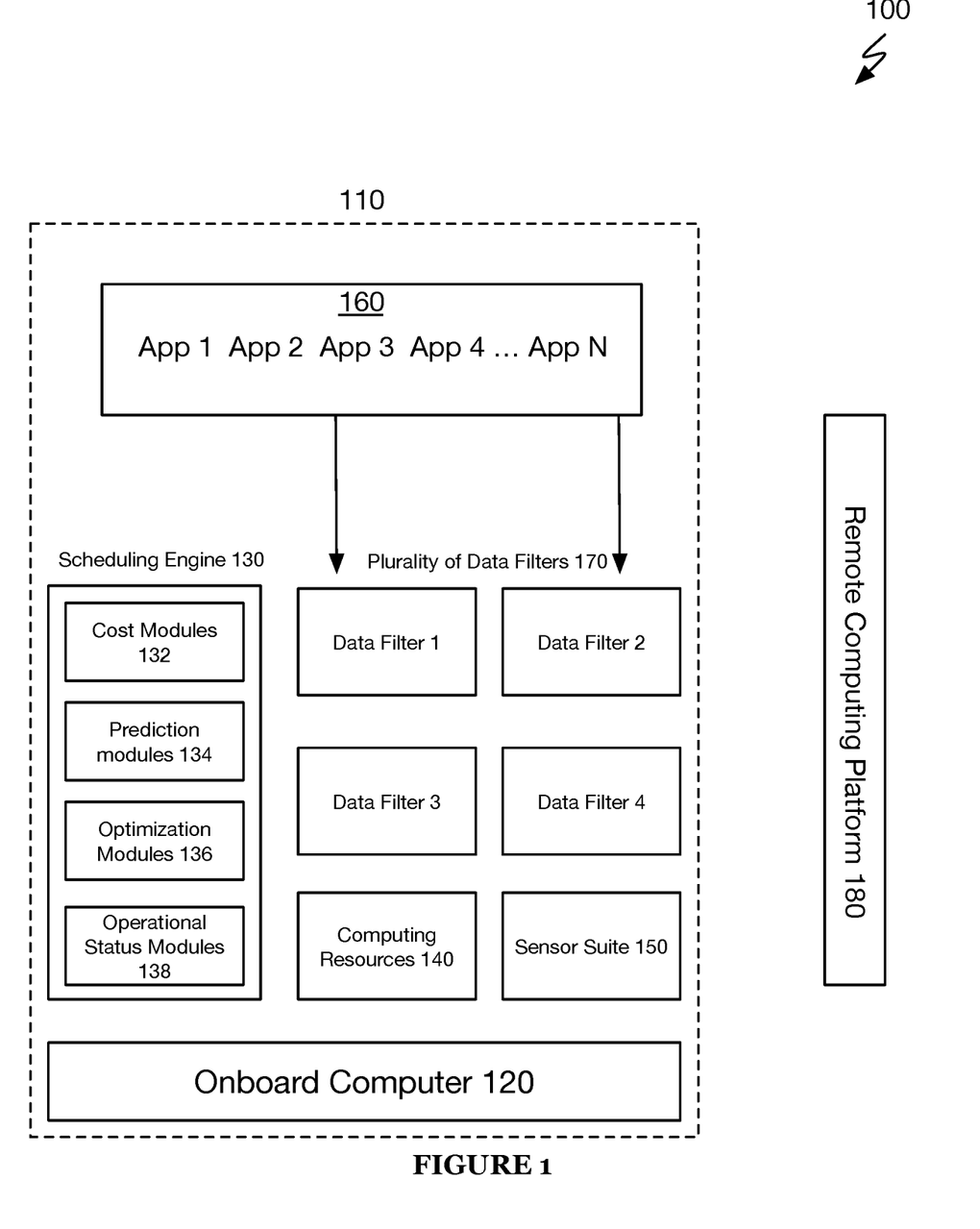
FIG. 1 illustrates a system 100 in accordance with one or more embodiments of the present application.

As shown in FIG. 1, the system 100 includes a vehicle 110 having an onboard computer 120, dynamic scheduling engine 130, computing resources 140, a sensor suite 150, and a plurality of application programs 160, a plurality of data filters 170, and remote computing platform 180.

The system 100 functions to enable dynamic software application management for a plurality of software applications operating onboard (e.g., local applications) and/or a plurality of software applications making run requests from a remote site (e.g., remote applications operating from the cloud) from the autonomous vehicle 110. Mainly, the system 100 functions to dynamically optimize application run schedules for a plurality of non-critical or non-operational applications. That is, the system 100 may identify applications that are not required for normal operations (e.g., driving safely) of the vehicle and seek to determine whether to run and at what time to run these non-operation critical applications.

The vehicle 110 is preferably a fully autonomous vehicle, but may additionally or alternatively be any semi-autonomous or fully autonomous vehicle; e.g., a boat, an unmanned aerial vehicle, a driverless car, etc. Additionally or alternatively, the vehicle 110 may be a vehicle that switches between a semi-autonomous state and a fully autonomous state (or a fully-manned state) and thus, the vehicle 110 may have attributes of both a semi-autonomous vehicle and a fully autonomous vehicle depending on the state of the vehicle 110. While embodiments of the present application are described herein as being implemented via a vehicle 110 (e.g., an autonomous vehicle or the like), it shall be noted that any suitable computing device (e.g., any edge device including mobile computing devices, etc.) capable of processing a plurality of applications may be used to implement various aspects of the embodiments of the present application to dynamically optimize run schedules for the plurality of applications.

The onboard computer 120 functions to control an autonomous vehicle 110. The onboard computer 120 is preferably coupled to a sensor suite (e.g., computer vision system, LIDAR, wheel speed sensors, GPS, etc.) and processes sensed data from the sensor suite and/or other sensors in order to determine the state of the autonomous vehicle; and, based upon the vehicle state and programmed instructions, the onboard computer 110 preferably modifies or controls behavior of the autonomous vehicle.

The onboard computer 120 is preferably a general-purpose computer adapted for I/O communication with vehicle control systems and sensor systems, but may additionally or alternatively be any suitable computing device.

The onboard computer 120 is preferably connected to the Internet via a wireless connection (e.g., via a cellular data connection). Additionally or alternatively, the onboard computer 120 may be coupled to a number of wireless or wired communication systems. For example, the onboard computer 120 of one vehicle may communicate with the onboard computers 120 of other vehicles over Bluetooth, short-range communication schemes (e.g., radio), and/or long-range communication schemes other than the Internet. As another example, the onboard computer 120 may be coupled to the remote computing platform 180 or any other computing system or device (e.g., a mobile phone or device), which may communicatively provide instructions or requests to the onboard computer 120. The remote computing platform 180 may be implemented by a server (or web server) or via a distributed computing system (e.g., the cloud). The remote computing platform may function to be, in some instances, control communication or assistive communication with the vehicle 110. The remote computing platform 180 may function to communicate with the vehicle 110 via a communication network (e.g., Internet, mesh network, LAN, WAN, GAN, etc.).

The computer processing circuits (e.g., CPU, GPU, etc.) of the onboard computer 120 may be used to implement the dynamic scheduling engine 130. Alternatively, the dynamic scheduling engine 130 may be implemented via the remote computing platform 180. The dynamic scheduling engine 130 functions to receive or ingests a plurality of application run requests and generate a dynamic application run schedule for the plurality of applications. The dynamic scheduling engine 130 may include and/or operate a number of assistive modules that can provide circumstantial information about a state of the vehicle as well as compute useful data that may be used in the dynamic run schedule generation process.

The assistive modules to the dynamic scheduling engine 130 may include cost modules 132, prediction modules 134, optimization modules 136, operational status modules 138 and the like.

The cost modules 132 may function to determine a computing resource costs to run specific application run requests. The cost modules 132 may receive a specific application run request and function to itemize the run requests to identify requested computing resources (e.g., CPU and memory resources) to run the processes of the application, a run time (e.g., a start time and end time (e.g. 1:00 pm to 1:02 pm and/or a runtime period (e.g., eleven seconds)), requested data resources (e.g., sensor data), and the like. The cost modules 132 may function to receive specific application run requests from one or more native applications operating on the vehicle 110, one or more third-party applications operating on the vehicle, one or more remote applications (e.g., cloud applications) operating on a remote computing system or distributed computing system, and the like. Accordingly, the specific application run requests may originate from any application that is in operable communication with one or more system components of the vehicle 110. The cost modules 132 may function to identify any sub-request within the application run requests that applies any operational load on any of the computing resources of the vehicle 110.

Once the costs modules 132 dissects an application run requests to its load application components, the cost modules 132 functions to determine or calculate computing resources costs for the application run requests. The computing resources costs calculation may take into account current circumstances of the vehicle 100 as well as predicted and/or future circumstances of the vehicle 100. The circumstances of the vehicle 110 may include any operational and/or non-operational circumstance that affects the computing loads (current or predicted) onto the vehicle 110. For example, the moving or non-moving state of the vehicle 110, the ON/OFF state of the vehicle 110, passenger or non-passenger state of vehicle 110, external events state (e.g., weather, emergencies, etc.) of the vehicle 110, and the like may be used to determine computing resources costs.

The costs modules 132 may consequently determine the computing resources cost for a specific application run request and further pair the computing resource cost with a proffered benefit of the application making the application run request. In this way, the dynamic scheduling engine 130 and/or the costs modules 132 may perform a cost-benefit analysis for the application run request. The proffered benefit may be any medium of value to the vehicle or entity maintaining the vehicle that may be offered in an application run request in exchange for executing the application run request. Thus, the proffered benefit may be credits, money, future benefits, data, cryptocurrency (e.g., bitcoin), access to a resource, fictitious currency, etc. The determined cost-benefit analysis for the application run request may be used as input into the dynamic application engine 130 when determine the dynamic application run schedules for the plurality of application run requests.

The prediction modules 134 may function to predict various data points that enable more accurate or precise dynamic application run schedules. The prediction modules 134 may function to predict future computing resources costs, future computing resources loads, future computing resources availability/unavailability, and/or any operational circumstance of the vehicle 110. The predictions by the prediction modules 134 may be based on one or more historical data points, expected future events (e.g., expected passenger pickup, expected weather, etc.), and the like. The prediction modules 134 may implement one or more predictive systems and/or predictive algorithms (e.g., machine learning algorithms), such as the predictive system disclosed in Application Ser. No. 62/513,564, which is incorporated in its entirety by this reference.

The optimization modules 136 function to optimize a number and application run order of which the applications making the plurality of application run requests. The optimization modules 136 may function to optimize the coordination and processing of data that may be used in fulfilling the application run request by, in some embodiments, centrally pre-processing data available or accessible to the vehicle 110 that may be useful to multiple application run requests. That is, in some embodiments, the optimization modules 136 function to identify application run requests which include requests for data resources that are the same and/or functional derivatives and aim to enable computational efficiencies in processing these application run request.

The operational status modules 138 function to identify operational status information of the vehicle 110. Operational status information may include any information or data that indicates a status of a general operation of the vehicle (e.g., dynamic, static, ON, OFF, etc.) and a status of specific operation of one or more components (e.g., CPU operations, memory operations, sensor operations, etc.) of the vehicle 110. It shall be noted that each of the modules described herein may be implemented using one or more computer processors or processing circuits.

The computing resources 140 may be a resource of system 100 that is any physical or virtual component of vehicle 110 that may be used to perform or used in performing digital tasks or computing tasks.

The vehicle sensor suite 150 functions to provide vehicle sensor data, which is preferably received through wired connections between vehicle sensor(s) and the vehicle computing system but can additionally or alternatively be received over wireless connections, a combination of wireless and wired connections, or any other suitable connections.

Vehicle sensor data is preferably raw data collected from a sensor of the vehicle but can be any suitable form of data derived from vehicle sensors. Raw data shall be understood to mean data that is a lossless representation of all information collected by a sensor or sensors; accordingly, it may be in any suitable lossless format. Alternatively, the vehicle sensor data can be compressed, derived data (e.g., derivative messages based on sensor data), compounded or combined data (e.g., fused data from multiple sensors, point clouds, feature parameters, object parameters, detected gradients, changes between sequential image frames, errors between a predetermined data model and actual measured data, classification of a data type, detected anomalies above a baseline, etc.), compressed data (e.g., using lossless or lossy compression), data segments, or any other suitable data. Vehicle sensor data can additionally or alternatively be downsampled. Derivative (e.g., derived) data can be specified and/or determined based on a remote request (e.g., specified processing module is activated, and a processing method specified in the remote request is applied to vehicle sensor data to generate the derived data), based on predetermined rules (e.g., always determined, and then stored and/or discarded), based on an application or client (e.g., wherein an on-board or remote third-party application associated with the vehicle requests certain types of derivative data), or determined in any suitable manner.

Vehicle sensor data can originate from the vehicle sensor suite 150 that includes any suitable vehicle sensor (e.g., interior or exterior on-board sensors, external sensors, etc.). Such sensors include embedded sensors, GPS systems, LiDAR, radar, cameras, audio sensors, temperature sensors, pressure sensors, position sensors, velocity sensors, timers, clocks, and any other suitable sensors. The data can be of any suitable type, including: image data, audio data, one-dimensional data (e.g., voltage, current), multi-dimensional data (e.g., point cloud, heatmap, functional surface, other 2D or 3D data, etc.), and/or time series.

The plurality of applications and programs 160 may include native applications (e.g., original applications installed by the manufacturer) and programs as well as third applications and programs. Each of the plurality of applications and programs 160 may function to generate application run requests that specifically identify run information that may be used by the dynamic scheduling engine 130 to generate dynamic application run schedules. The run information may include requested computing resources (e.g., CPU and memory resources) to run the processes of the application, a required run time (e.g., a start time and end time (e.g. 1:00 pm to 1:02 pm and/or a required runtime period (e.g., eleven seconds)), requested data resources (e.g., sensor data), and the like.

The plurality of data filters 170 function to process the data resource requests made by the plurality of applications 160. Preferably, the plurality of data filters 170 receive the data resource requests either directly from the applications making application run requests or alternatively, after an initial analysis of the application run request has been performed, such as in S210. Thus, plurality of data filters may be used to pre-process or filter the data resource requests within an application run request to identify potential efficiencies that may achieved by aggregating and storing to a short-term storage device those data resources that are repeatedly or frequently requested by multiple applications.

Additionally, the plurality of data filters 170 function to process sensor data from the sensor suite 150 based on the application run requests received from the plurality of applications 160. That is, based on the type of data resources request made by the plurality of applications 160, the plurality of data filters 170 may function to arrange or allocate the sensor data from the sensor suite 150. Some of the plurality of data filters 170 may include, for example, Filter 1: Do nothing and dump data; Filter 2: Do nothing and store sensor data to a buffer; Filter 3: Do nothing and store data in SSD; Filter 4: Pass along raw data; Filter 5: Execute a function (data may not be involved); Filter 6: Extract an area of raw image data; Filter 7: Perform fast Fourier transform, and the like. The above-noted filters are just examples of types of filters that may be implemented by the plurality of filters 170 and should not be limited thereby.

All or some of the processes described herein are preferably performed by a vehicle system in cooperation with a remote computing system but can alternatively be performed entirely by the remote computing system, the vehicle system, or any other suitable system. The vehicle system is preferably onboard the vehicle (e.g., a vehicle computer integrated with the vehicle), but can additionally or alternatively be decoupled from the vehicle (e.g., a mobile device within the vehicle). The vehicle system includes a processing system (e.g., graphical processing unit or GPU, central processing unit or CPU) as well as memory. The memory can be short term (e.g., volatile, non-volatile, random access memory or RAM, etc.) and/or long term (e.g., flash memory, hard disk, etc.) memory. The vehicle system can also include a wireless communication system (e.g., Wi-Fi, Bluetooth, cellular 3G, cellular 4G, cellular 5G, multiple-input multiple-output or MIMO, one or more radios, or any other suitable wireless communication system or protocol), a wired communication system (e.g., modulated powerline data transfer, Ethernet, or any other suitable wired data communication system or protocol), sensors, and/or a data transfer bus (e.g., CAN, FlexRay). The remote computing system can include a user device (e.g., a mobile phone, a laptop, etc.), a remote server, a cloud server, or any other suitable local and/or distributed computing system remote from the vehicle. The remote computing system is preferably connected to the vehicle system through one or more data connections (e.g., channels), but can alternatively communicate with the vehicle system in any suitable manner.

One or more instances of the method and/or processes described herein can be performed asynchronously (e.g., sequentially), concurrently (e.g., in parallel), or in any other suitable order and/or using one or more instances of the systems, elements, and/or entities described herein.

2. Method for Dynamic Application Execution

Figure 2:
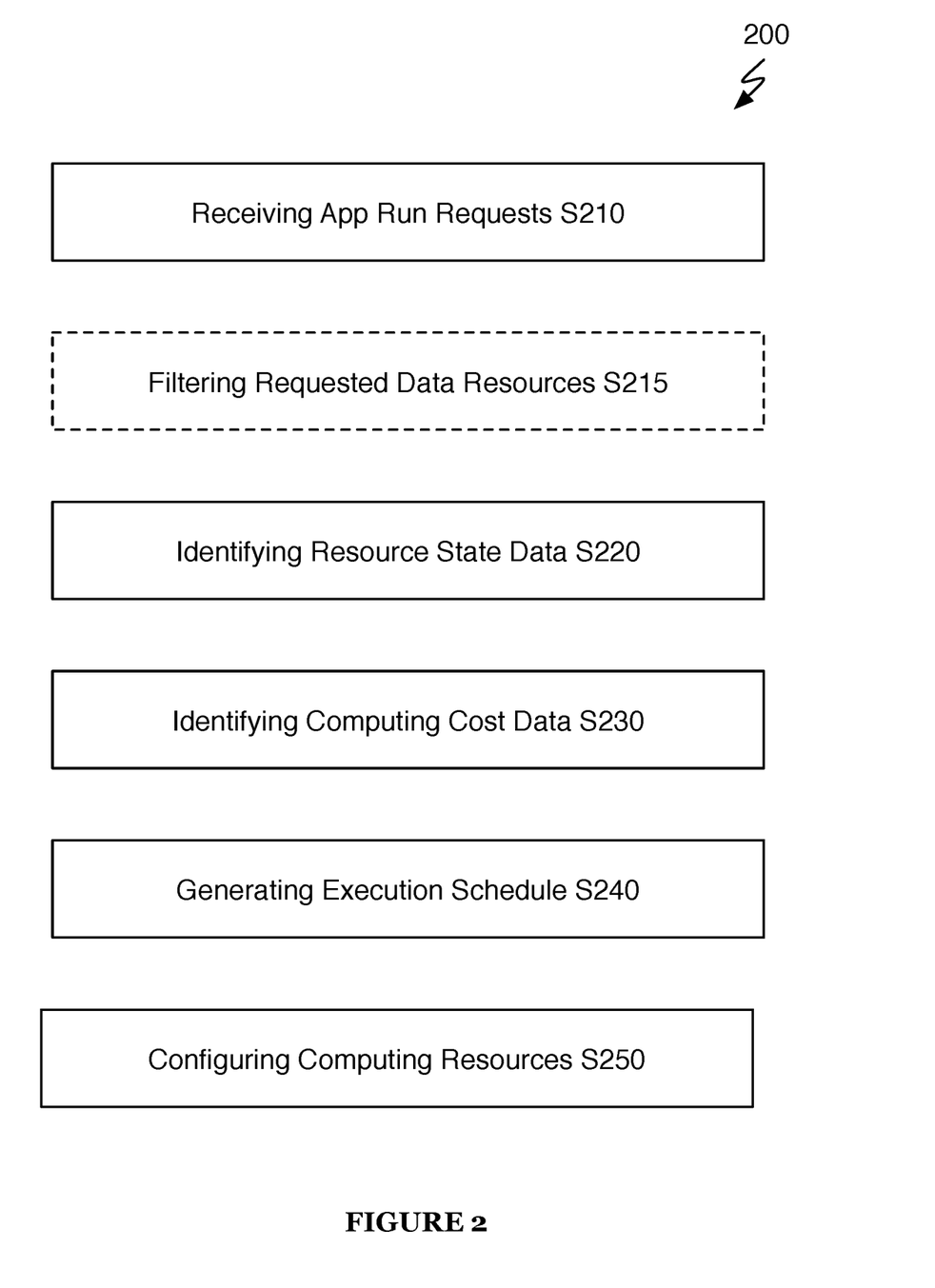
FIG. 2 illustrates a method 200 in accordance with one or more embodiments of the present application.

As shown in FIG. 2, the method 200 includes receiving and analyzing a plurality of application run requests S210, identifying current computing resources state data and predicting computing resource state data S220, identifying current computer resource costs data and predicting computing resource cost data S230, dynamically generating an execution schedule for executing each of the plurality of application requests S240, configuring one or more computing resources of the vehicle and executing the plurality of application execution requests according to the execution schedule S250. The method 200 may optionally include pre-processing requested data resources S215.

The method 200 functions to enable an optimized management of a plurality of applications (e.g., thousands to millions of applications) placing application run request loads to a vehicle. Specifically, in view of the dynamic operation of a vehicle, such as an autonomous vehicle, the method 100 seeks to balance the implementation of operation-critical programs (e.g., vehicle driving programs) with the implementation of some or all of non-operation-critical applications or programs to reduce computing resource exhaustion by dynamically optimizing run schedules for the non-operation critical applications.

The method 200 generally functions to analyze application run requests to identify cost drivers of the run request, computing resources to be used when executing the run request, as well as benefit(s) provided by the application run request, if executed. An assessment of the run request performed in one or more embodiments of the present application (e.g., method 200) allows for, at least, a computing cost determination, which may be used to inform a cost-benefit analysis of the application run request. Additionally, the method 200 may function to identify current and/or future state information of the vehicle executing the application run requests as well as current and future state data of the local computing resources of the vehicle that may be utilized for executing a specific application run request. This state data of the vehicle (e.g., mode of operation, travelling/non-travelling, etc.) and state data of the computing resources of the vehicle may be used together with cost/benefit data of the run request, as input, into a dynamic application run request scheduling performed by the method 200. The method 200 may take into one or more of these above-noted factors along with various ancillary factors that may be useful for defining and/or refining the application run request schedule.

It shall be noted that the method 200 preferably enables a real-time or substantially real-time (e.g., within 0-20 seconds of receiving application requests) operation of one or more and/or of all steps of the method 200 and the like. For instance, the method 200 may be executed during a real-time operation of an autonomous vehicle or the like that may be functioning to execute application requests from multiple distinct applications. Thus, the method 200 may function to determine and/or allocate computing resources of the autonomous vehicle that may function to safely enable an operation of the autonomous vehicle and an execution of the multiple application requests. Additionally, or alternatively, while in one or more embodiments, time-sharing of computing resources may be implemented, the method 200 preferably functions to optimize constrained computing resources of an autonomous vehicle or the like in which time-sharing of computing resources of the autonomous vehicle may be limited or not enabled for applications or a subset of applications. In such instances, an optimal scheduling and execution of application requests may be essential for an intelligent and safe operation of the autonomous vehicle or the like.

S210, which includes receiving and analyzing a plurality of application run requests, functions to receive application run requests from the plurality of distinct applications operating with or remotely from the vehicle. In a preferred embodiment the application requests may originate from onboard the vehicle; however, application requests may also originate from one or more remote sources (e.g., the cloud, remote computing platform, another vehicle, a remote mobile device, devices of an emergency service person, etc.). It shall be understood that application requests may be received in any manner from any suitable source being in operable communication with the vehicle.

The application run (execution) requests may include or preferably relate to any type of request(s) including a request to execute one or more functions or processes of an application (e.g., execute scripts or code of the app or program), a request for data obtained by one or more components of the vehicle or obtained or generated by another application operating with the vehicle, a request for application execution costs data, and the like.

The application requests may be received in any order or simultaneously from the plurality of applications. However, the order in which the application run requests are received may only be a small factor, if considered to be a factor at all, in some embodiments, when determining run schedules for the applications. For example, even if an application A makes a run request seconds before requests made by applications B and C, it is possible that the requests of applications B and C may be performed or responded to prior to the request of application A based on the optimization parameters of the method 200.

S210, additionally functions to analyze the application run requests to identify request types for each of the application run requests. A request type, as alluded to above, may be governed by or relates to a content of an application request. Accordingly, there may be a plurality of request types including run or execution requests, data requests, connection requests, login requests, etc. Identifying the request type for each application requests enables S210 to direct or route each of the application requests to an appropriate filter or other processing element based on the request type. In some embodiments, one or more of the application run requests may include a request type and/or an indication of which of a plurality of filters that the application run request should be processed through. Additionally, in some embodiments, S210 may analyze execution or run requests to identify the control operations and/or logic functions of these requests. This resulting analysis may be fed into a costing module that allows the method 200 to determine or estimate a cost for executing a specific execution or run request. That is, in some embodiments, the request type from an application may enable a determination or an estimation of a workload that may be applied to one or more systems of a vehicle or other computing entity that may function to execute the run request. Thus, an identification of a request type for a given application request may enable an abbreviated and/or fast computation of an expected expenditure of computing resources of the executing entity based on an associated estimated or expected workload of the request type.

S210, additionally, may function to itemize each of the application run requests to identify one or more of requested computing resources (e.g., CPU and memory resources) to run the processes of the application (and possibly an amount of the computing resources), a run time (e.g., a start time and end time (e.g. 1:00 pm to 1:02 pm and/or a runtime period (e.g., eleven seconds)), requested data resources (e.g., sensor data), and the like. S210 may transmit or pass the itemize components of the application run request to the appropriate modules for processing. For instance, S210 may pass the requested computing resources of an application run request to a costing module for computing resource cost estimation. Since each application run request may additionally include a proffered benefit to the vehicle in exchange for executing an application run request, S210 may function to also itemize or identify the proffered benefit of each application run requests.

Additionally, or alternatively, S210 may function to use the proffered benefit of each application run request to generate a list, schedule, or other reference data structure that ranks or orders each of the application run requests based on the proffered benefit or proffered benefit amount. That is, S210 may function to list the application run requests in order of greatest to least (or least to greatest) proffered benefit. S210 may function to provide the generated list as input into the dynamic application scheduling of S240. Additionally, or alternatively, each application run request may be ranked based on a calculated execution score that may be used in conjunction with or in lieu of a cost-benefit score for each application run request. An execution score for a given application request may be computed using any attribute and/or factor associated with the given application request including, but not limited to, the application request type, a computing resource costs for the application request, the proffered and/or expected benefit to the executing entity (e.g., the vehicle), and the like.

Additionally, or alternatively, S210 may function to analyze the plurality of run requests in the aggregate. In this way, S210 preferably functions to determine a current demand or demand score based on the number of application run requests received within a predetermined period of time. The calculated demand score may be used to define or re-define execution thresholds such that when the demand score is high, the application run request schedule generator may set a higher benefit requirement or threshold for executing a run request or alternatively, set a higher or enhanced cost-benefit score for executing a run request. Additionally, or alternatively, S210 may function to assess a computed demand score for the aggregate of the plurality of run requests against a demand threshold, such that if the demand score satisfies or exceeds the demand threshold, the method 200 may function to reduce a number of application run request that may be fulfilled and/or executed to minimize a potential workload on one or more computing systems of a vehicle and/or the like.

Figure 3:
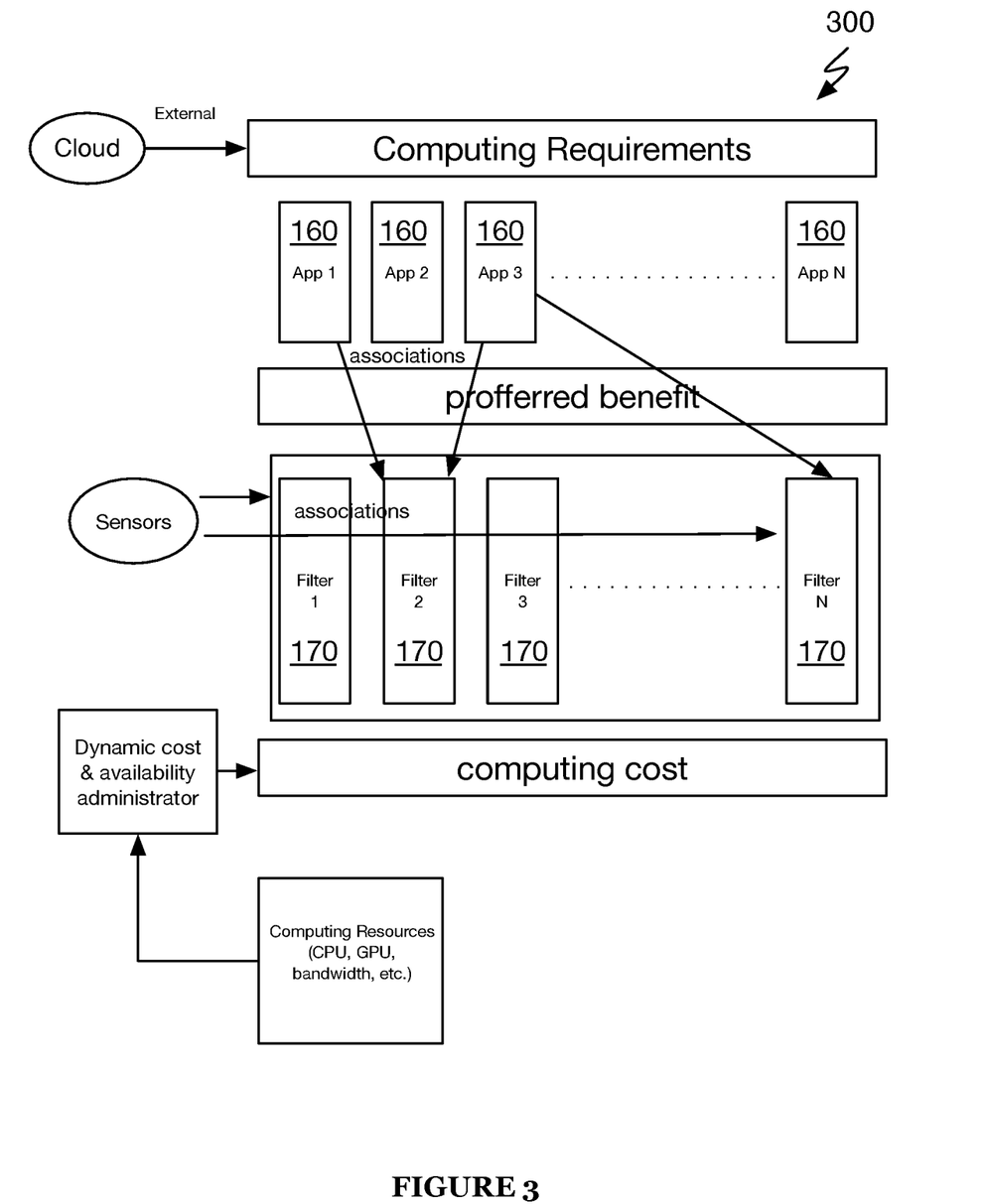
FIG. 3 illustrates an example system in accordance with one or more embodiments of the present application.

S215, which includes pre-processing or filtering requested data resources, functions to centrally pre-process data resources that are requested by multiple application run requests, as shown in FIG. 3. For instance, if application A and application D both request data resource d_G, then data resource d_G may be automatically flagged and/or filtered by S215 as a severally-requested data resource.

S215 functions to enable data processing efficiencies by identifying data resources provided by the vehicle or the like that is requested with high frequency by multiple application run requests. Identifying the repeating data resource requests allows, S215 to transmit these data resources to a short-term memory, a quickly-accessible storage, or a storage element (e.g., RAM) until a time that all executed application run requests using those data resources are done executing. Storing the severally-requested data resources reduces constant computing effort to identify, query, and/or pull the requested data from a more permanent storage location or the like. Also, filtering repeating data requests in this manner by S215 functions to reduce the costs associated with several application run request, as the computing costs are amortized among multiple applications.

S220, which includes identifying current computing resources state data and predicting computing resource state data, functions to determine state data (e.g., status) for each computing resource and/or operational resource of the vehicle that will be implemented in executing the application request. The state data for each of the computing resource and/or operational resource may include data relating to a current and/or future state of the computing and/or operational resource. The state data may include whether or not the computing and/or operational resource is currently in use (i.e., current availability), recent use data, future or scheduled utilization data, an energy level or amount of the vehicle, computational processing power available, computational processing power capacity, available memory and memory capacity, positioning information of the vehicle, operational or non-operational data of the vehicle, and the like. Thus, the state data may be any suitable data or information about a computing resource and/or an operational resource of a vehicle that may identify a capability of the computing resource to perform one or more operations and/or processes for fulfilling one or more application requests.

S220 may function to actively or passively collect state data. In some instance, the collection or aggregation of state data is triggered by the receipt of an application run requests. In such embodiments, S220 may function to send data probes and/or queries to each of the computing resources of a vehicle or computing entity responsive to the receipt of an application request. In one variation, S220 may function to continuously query each of the computing resources and/or operational resources of the vehicle for state data. Additionally, or alternatively, many of the computing resources and/or operational resources of the vehicle may be preprogrammed or configured to actively provide state data (e.g., passive aggregation of state data) according to one or more predetermined schedules and/or on a basis of an occurrence of an event or the like.

State data identified in S220 may be provided as input for determining dynamic application run schedules, as described later in S240, for each of the plurality of application run requests received in S210.

S230, which includes identifying current computing resource cost data (e.g., an amount of a computing resource that will be consumed and/or utilized by a given application request) and predicting computing resource cost data, functions to implement a costing module or similar module for determining direct and/or indirect costs to the vehicle for potentially executing the application run requests. Accordingly, S230 may include identifying each of the cost-incurring operations of an application run request.

Computing resource cost, as referred to herein, may be any computing resource costs directly or indirectly related to a handling, fulfillment, and/or an execution of an application run request by the vehicle and/or by an affiliate of the vehicle. In a preferred embodiment, the computing resource cost may be based on costs exceeding a minimum cost threshold. The minimum cost threshold may be defined by a normal or average computing resource costs for evaluating an application run request (e.g., identifying computer resource costs for the application). The minimum cost threshold acknowledges that there is some amount of computing resources expended in the evaluation of an application run request and allows those evaluation costs to form a basis from which the actual computing resource costs for executing or fulfilling the application request may be calculated from. Accordingly, in some embodiments, the average computing resource costs for evaluating an application run request defines a minimum cost threshold (or floor) and any identified computing resource cost for executing or fulfilling the application run request that exceeds a value of the minimum cost threshold may be considered the computing resource costs for executing or fulfilling an application run request. Additionally, or alternatively, the minimum cost threshold (e.g., an amount of computing resources used in evaluating or determining a run schedule) may be included in an overall computing resource costs for a specific application run request.

S230 functions to determine direct costs associated with executing an application request. The direct costs associated with executing the application request may typically include computing resource costs and various operations cost for implementing one or more real-world operations by one or more computing resources of the vehicle. For instance, the computing resources costs may include and/or relate to a cost to process the application request by a main CPU operating the vehicle (e.g., processing time and processing/computing power), a cost to allocate portions of memory during the pre-execution, during execution, and post-execution processes involved in executing the application request, a cost relating to a battery or limited energy supply used in powering other computing resources (e.g., the main CPU) for the executing the application request or powering other operational resources (e.g., components of an actuator) of the vehicle, and the like.

S230 further includes identifying indirect or implicit costs of executing the application request. These indirect or implicit costs mainly relate to opportunity costs associated with executing the application request. For instance, when (or after) executing the application request, the limited resources of the vehicle may be unavailable to be used by other applications and/or one or more other operations or functions of the vehicle. The indirect costs associated with the missed opportunities to execute some of these operations or functions are determined and may be considered in an overall cost value associated with executing the application requests.

S230 functions to determine, in various manners, the costs associated with executing an application request. In a first implementation, S230 may determine costs associated with executing an application request based on historical execution costs associated with executing a same or substantially similar application request. Accordingly, in such embodiments, S230 may function to assess a reference resource (e.g., a reference table or the like) having historical computing resource cost and/or expenditure values for a given application request type or the like. In the case that a same application request cannot be identified, S230 may alternatively estimate the cost of running the application based on historical costs of running a substantially similar application. S230 may modify the historical costs of running a substantially similar application to increase the cost estimate or to reduce the cost estimate in light of the extent of the differences in the cost-incurring operations of the application request and the substantially similar application request.

In a variant of the first implementation, S230 may generally function to determine costs associated with executing an application request according to an expected (e.g., future) costs of executing a subject or future application request. S230 may determine the expected costs of executing an application request in any suitable manner including by using on one or more predictive models (e.g., regression models, trained inferential machine learning models, etc.) that function to estimate or predict application request execution costs. For instance, S230 may function to deploy a machine learning model that may be specifically trained for predicting one or more computing resource costs for fulfilling a given application request. In such instance, S230 may function to input one or more attributes of the application request, such as a request type, etc., and the trained machine learning model may function to predict or estimate a computing resource cost based on the input.

In a second implementation of S230, S230 may function to determine costs associated with executing an application request based on a predetermined cost schedule for executing application requests. In such implementation, the predetermined cost schedule includes cost values for all application requests or request types that the vehicle may execute. The predetermined cost schedule may be updated periodically to include cost values for executing new application request by the vehicle. The predetermined cost schedule can also be updated to include modified or new cost values based on an actual cost incurred by the vehicle in executing an application. Thus, the S230 may continuously measure actual cost values for executing an application against the predetermined cost schedule and when a discrepancy is identified between an actual cost value and a predetermined cost value in the predetermined cost schedule, S230 may update the predetermined cost schedule to reflect the more recent or accurate cost value.

Accordingly, S230 functions to generate a list, schedule, or other data structure that identifies a computing resource costs (current and/or predicted) for each of the plurality of application run requests received in S230. S230 may additionally function to provide the generated computing resource cost list or schedule into S240, as input, for generating run schedules.

S240, which includes dynamically generating an application run request execution schedule for executing the plurality of application run requests, functions to identify run request execution parameters for each of the plurality of application run requests. The execution parameters preferably define for each application run request whether the application run request will be executed, an execution order of the run request (e.g., an overall order of execution with run start/run end times, executing run requests in series or parallel, etc.), execution timing of the run request, run request execution conditions and/or dependencies, allocated computing resources to the run request, a likelihood of successful completion of the run request, and the like.

S240 preferably functions to identify the run request execution parameters and generate the dynamic application execution schedule based on one or more run request execution factors and in some embodiments, a generated execution score. The execution factors may include factors that drive a cost-benefit determination or score for each of the application run requests. Execution factors, such as those defined in S210-S230, preferably include one or more of a proffered benefit, state data of the vehicle, computing resources state data, a computing resource cost of executing the run request, whether centrally pre-processed data are required, demand score, and the like. Accordingly, S240 may function to use the computed execution score to identify a positive or a negative execution position indicating whether or not the application request will be conditionally and/or likely executed by the vehicle or the like. In one embodiment, the computed execution score may be assessed against an execution threshold and if the computed execution score for a given application request satisfies the execution threshold, S240 may function to indicate or identify a positive execution potential for the given application request.

Using the execution factors, S240 preferably determines a cost-benefit score that compares the benefit offered by a run request to execution costs (e.g., cost of computing resources or execution costs) associated with the run request. The cost-benefit score may be based on the net positive or negative difference between the benefit and the execution costs, such that a higher net positive difference may indicate a higher likelihood that the application run request will be executed relative to a lower net positive difference. A negative difference may indicate a lower likelihood of execution or a zero probability of execution since it may cost the vehicle more in resources than the benefit offered by the application run request.

Accordingly, S240 may generate an application run request execution schedule based on any suitable execution factors, including the factors described herein and other reasonably implied factors. In one implementation, a system performing method 200 may be configured to select one of a plurality of scheduling optimization algorithms that uses, as input, one or more of the execution parameters, one or more of the factors, and the like to generate the application run request schedule. The plurality of scheduling optimization algorithms may be individually tailored according to an operation mode of the vehicle. For example, a vehicle may include several modes of operation including autonomous driving mode, semi-autonomous driving mode, aggressive driving mode, sporty driving mode, conservative driving mode, fully-manned driving mode, and the like. The mode of operation of the vehicle may be determinable for vehicle state data. For each of the modes of operation of the vehicle, there may be a scheduling optimization algorithm that is specifically tailored for the identified mode of operation. Thus, a plurality of scheduling optimization algorithms may exist where each scheduling optimization algorithm is different.

In one implementation, S240 additionally distributes a respective execution schedule to the application that submitted an application run request. S240 may additionally or alternatively distribute to each application making an application run request a master application run request execution scheduling that includes the execution schedules for all application run requests. By providing the application run request execution schedule, allows a respective application an opportunity to evaluate whether or not its run request will be executed and if being executed, the order in which its run request will be executed. This, in turn, may prompt an application agent or the like of the application to potentially resubmit its application run request (or resubmit a bid) with modified request terms, which may include one or more of a higher proffered benefit or reduced/increased process execution requests. If the resubmitted run request bid is accepted, this may cause a change in the execution parameters (e.g., earlier start time, from non-execution to execution, etc.) for the specific application run request. A system executing the method 200 may allow an application to resubmit run request bids up to a predetermined number (e.g., three times) of times before closing out a revised bidding window.

S250, which includes configuring one or more computing resources of the autonomous and executing the plurality of application execution requests according to the execution schedule, functions to specifically configure the computing resources components of the vehicle to execute application run requests and initialize the execution of application run requests that exceed an execution threshold (e.g., execution score, cost-benefit score, etc.), as identified within the application run request execution schedule.

The execution of the application run request execution schedule may be dynamic, in that, real-time events (e.g., unexpected events, emergencies, receipt of new information, etc.) that may change a state of the vehicle and/or of one or more computing resources of the vehicle may cause a change to the execution thresholds thereby causing less or more application run requests to be executed by the system implementing method 200.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed is:

1. A system for dynamically managing application loads on one or more computing systems of a vehicle, the system comprising:
   an onboard computing system of a vehicle that:
      receives a plurality of distinct application requests from a plurality of distinct applications;
      for each one application request of the plurality of distinct application requests, identifies expected computing resource expenditure data based on one or more attributes of each one application request; and
      identifies current state data for each of a plurality of computing resources of the vehicle based on an expected utilization of each of the plurality of computing resources for fulfilling each one application request;
      centrally pre-processes data resources that are requested by multiple application requests of the plurality of distinct application requests, wherein the centrally pre-processing includes:
         identifying overlapping requests from the plurality of distinct application requests for a same type or a same kind of data resource of the vehicle by two or more of the multiple application requests, and
         identifying the data resource as a multiply-requested data item;
      transmits the multiply-requested data item to a short-term memory until all application requests being executed have completed a use of the multiply-requested data item;
      during a real-time operation of the vehicle, dynamically generates an execution schedule for executing a subset of each of the plurality of distinct application requests based on (1) the expected computing resource expenditure data for each one application request and (2) the current state data for each of the plurality of computing resources of the vehicle; and
      executes the subset of each of the plurality of distinct application requests based on the execution schedule.

2. The system according to claim 1, wherein:
   if one or more of the plurality of distinct application requests includes one or more requested timetables for execution, the onboard computing system further:
      predicts future state data for each of the plurality of computing resources of the vehicle based on one or more requested start times in the one or more timetables;
      predicts future computing resource expenditure data based on one or more attributes of each one application request and an anticipated state of operation of the vehicle; and
      dynamically generating the execution schedule for executing the subset of or each of the plurality of distinct application requests is further based on (3) the predicted future state data for each of the plurality of computing resources of the vehicle and (4) the predicted future computing resource expenditure data.

3. The system according to claim 1, wherein:
   the onboard computing system further:
      assesses each of the plurality of distinct application requests; and
      identifies a request type elected from a plurality of distinct request types for each of the plurality of distinct application requests based on the assessment,
      wherein the identifying the expected computing resource expenditure data for fulfilling each of the plurality of distinct application requests is based on the request type for each of the plurality of distinct application requests.

4. The system according to claim 1, wherein:
   the onboard computing system further:
      assesses each of the plurality of distinct application requests; and
      identifies one or more requested computing resources for fulfilling each of the plurality of application requests based on the assessment,
      wherein the identifying the expected computing resource expenditure data for fulfilling each of the plurality of distinct application requests is based on the one or more requested computing resources of each of the plurality of distinct application requests.

5. The system according to claim 1, wherein:
   identifying the current state data for each of the plurality of computing resources of the vehicle includes:
      identifying a utilization value for each of the plurality of computing resource of the vehicle, wherein the utilization value relates to an amount of a total capacity of a given computing resource that is in use.

6. The system according to claim 1, wherein
   the expected computing resource expenditure data relates to an expected expenditure of a computing resource of the vehicle based on a likely fulfillment of a subject application request.

7. The system according to claim 6, wherein
   identifying the expected computing resource expenditure data includes:
      (i) for each unique computing resource of the vehicle, identifying an expected utilization value based on the plurality of application requests; and
      (ii) computing the expected computing resource expenditure data for a subject application request based on the expected utilization value.

8. The system according to claim 1, wherein
   identifying the expected computing resource expenditure data includes:
      identifying computing resource expenditures associated with executing a given application request based on historical execution costs associated with executing a same or a substantially similar application request.

9. The system according to claim 1, wherein
   identifying the expected computing resource expenditure data includes:
      referencing a predetermined cost schedule based on one or more attributes of the plurality of application request, wherein the predetermined cost schedule includes a listing of estimated costs for executing a plurality of distinct types of application requests.

10. The system according to claim 9, wherein
    one or more cost values of the predetermined cost schedule are updated to include new costs values for executing a given application request when a discrepancy between a predetermined cost value and an actual cost value for executing the given application request is identified.

11. The system according to claim 1, wherein
    dynamically generating the execution schedule includes:
       generating execution parameters that define for each application request (i) whether the application request is expected to be executed and (ii) an expected execution time for executing the application request.

12. The system according to claim 1, wherein dynamically generating the execution schedule includes:
generating an execution score for each application request;
assessing the execution score against an execution threshold; and
identifying a positive execution likelihood or a negative execution likelihood based on the assessment.

13. The system according to claim 1, wherein:
the onboard computing system further:
distributes a copy of the execution schedule to each application making an application request of the plurality of distinct application requests;
responsive to the distribution, receives one or more modified application requests.

14. The system according to claim 1, wherein one or more of the plurality of distinct application requests relates to a request by an onboard third-party application.

15. The system according to claim 1, wherein one or more of the plurality of distinct application requests relates to a request by a remote third-party application.

16. A method for dynamically managing application loads on one or more computing systems of a vehicle, the method comprising:
receiving a plurality of distinct application requests from a plurality of distinct applications;
for each one application request of the plurality of distinct application requests, identifying expected computing resource expenditure data based on one or more attributes of each one application request; and
identifying current state data for each of a plurality of computing resources of the vehicle based on an expected utilization of each of the plurality of computing resources for fulfilling each one application request;
centrally pre-processing data resources that are requested by multiple application requests of the plurality of distinct application requests, wherein the centrally pre-processing includes:
identifying overlapping requests from the plurality of distinct application requests for a same type or a same kind of data resource of the vehicle by two or more of the multiple application requests, and
identifying the data resource as a multiply-requested data item; and
transmitting the multiply-requested data item to a short-term memory until all application requests being executed have completed a use of the multiply-requested data item
dynamically generating by an onboard computing system of a vehicle an execution schedule for executing a subset of each of the plurality of distinct application requests based on (1) the expected computing resource expenditure data for each one application request and (2) the current state data for each of the plurality of computing resources of the vehicle; and
executing the subset of each of the plurality of distinct application requests based on the execution schedule.

\* \* \* \* \*